(12) United States Patent
Sudhoff-Ewers et al.

(10) Patent No.: US 9,912,534 B2
(45) Date of Patent: Mar. 6, 2018

(54) COMPUTER SYSTEM, METHOD FOR STARTING A SERVER COMPUTER, SERVER COMPUTER, MANAGEMENT STATION, AND USE

(75) Inventors: Michael Sudhoff-Ewers, Paderborn (DE); Lothar Berner, Unterhaching (DE); Andreas Thoelke, Paderborn (DE)

(73) Assignee: FUJITSU LIMITED, Kawasaki (JP)

( * ) Notice: Subject to any disclaimer, the term of this patent is extended or adjusted under 35 U.S.C. 154(b) by 210 days.

(21) Appl. No.: 14/232,055

(22) PCT Filed: Jun. 21, 2012

(86) PCT No.: PCT/EP2012/061998
§ 371 (c)(1),
(2), (4) Date: Mar. 13, 2014

(87) PCT Pub. No.: WO2013/007490
PCT Pub. Date: Jan. 17, 2013

(65) Prior Publication Data
US 2014/0317247 A1    Oct. 23, 2014

(30) Foreign Application Priority Data
Jul. 11, 2011    (DE) .................. 10 2011 107 092

(51) Int. Cl.
*H04L 12/24*    (2006.01)
*G06F 9/455*    (2006.01)
*G06F 9/50*    (2006.01)

(52) U.S. Cl.
CPC ...... *H04L 41/0806* (2013.01); *G06F 9/45533* (2013.01); *G06F 9/5077* (2013.01); *G06F 2009/45579* (2013.01)

(58) Field of Classification Search
CPC ......... H04L 7/00; H04L 7/0004; H04L 12/00; H04L 12/02; H04L 12/12; H04L 12/24;
(Continued)

(56) References Cited

U.S. PATENT DOCUMENTS 6,128,296 A * 10/2000 Daruwalla .......... H04L 12/4625
370/389
6,393,570 B1 * 5/2002 Henderson ............ G06F 1/3203
713/310

(Continued)

FOREIGN PATENT DOCUMENTS

EP    1301010 A1 *  4/2003  ........ H04L 29/12113
EP    1 355 476 A1    10/2003
(Continued)

OTHER PUBLICATIONS

Fujimaki et al.—Fujitsus Primergy BX620 S4 Blade Server for Solving Server Consolidation Problems—Fujitsu13 Jan. 15, 2008.*

(Continued)

*Primary Examiner* — Brian J Gillis
*Assistant Examiner* — Boris Grijalva Lobos
(74) *Attorney, Agent, or Firm* — Fujitsu Patent Center

(57) ABSTRACT

A computer system includes a server computer including a processor, a main memory and a system management chip, a management station that manages server profiles and selects a server profile from server profiles and associates it with the server computer, and at least one data network via which the server computer and the management station are coupled to interchange data, wherein the system management chip of the server computer is set so that, when the system management chip activates, it sends an inquiry regarding a server profile associated by the management station to the management station, so that, if a management connection can be set to the management station, it config- (Continued)

ures a component of the server computer by using a network identifier transmitted by the management station, and to otherwise prevent starting of the server computer with a network identifier transmitted by the management station previously.

17 Claims, 3 Drawing Sheets

(58) Field of Classification Search
CPC .............. H04L 12/2409; H04L 12/2413; H04L 12/2424–12/243; H04L 12/2449–12/2453; H04L 12/2454; H04L 12/2455; H04L 12/2457; H04L 12/2483; H04L 12/2497; H04L 41/00; H04L 41/04–41/046; H04L 41/08–41/0823; H04L 41/0836; H04L 41/0876–41/0893; G06F 13/00; G06F 15/00; G06F 15/16; G06F 15/173; G06F 9/45533; G06F 9/5077; G06F 9/45579
See application file for complete search history.

(56) References Cited

U.S. PATENT DOCUMENTS

| | | | |
|---|---|---|---|
| 7,363,514 B1* | 4/2008 | Behren | G06F 9/4416 713/100 |
| 7,502,370 B2* | 3/2009 | Pettey | G06F 3/00 370/389 |
| 7,590,727 B1* | 9/2009 | Barnes | G06F 11/2023 709/208 |
| 7,814,274 B2* | 10/2010 | Howard | G06F 9/4416 711/114 |
| 7,856,488 B2 | 12/2010 | Cripe et al. | |
| 7,856,489 B2 | 12/2010 | Mouser et al. | |
| 7,971,045 B1* | 6/2011 | Currid | G06F 9/4416 709/226 |
| 8,285,981 B2* | 10/2012 | Assouad | H04L 41/085 713/1 |
| 8,615,571 B2* | 12/2013 | Bower | H04L 29/12283 709/220 |
| 2003/0103617 A1* | 6/2003 | Brown | H04M 3/523 379/265.02 |
| 2004/0034763 A1* | 2/2004 | McCardle | G06F 9/4416 713/1 |
| 2004/0111559 A1* | 6/2004 | Heil | G06F 9/4405 711/114 |
| 2005/0097310 A1* | 5/2005 | Chu | G06F 21/575 713/2 |
| 2005/0120160 A1 | 6/2005 | Plouffe et al. | |
| 2006/0047813 A1* | 3/2006 | Aggarwal | H04L 67/1008 709/226 |
| 2006/0143255 A1 | 6/2006 | Shinohe et al. | |
| 2006/0143602 A1* | 6/2006 | Rothman | G06F 11/0709 717/171 |
| 2007/0115818 A1 | 5/2007 | Bose | |
| 2009/0028082 A1* | 1/2009 | Wynn | H04L 63/0428 370/310 |
| 2009/0077208 A1* | 3/2009 | Nguyen | H04L 29/12839 709/221 |
| 2009/0083398 A1* | 3/2009 | Ford | G06F 15/177 709/220 |
| 2009/0144730 A1 | 6/2009 | Chen et al. | |
| 2009/0157856 A1 | 6/2009 | Ogasawara et al. | |
| 2009/0172381 A1 | 7/2009 | Zimmer et al. | |
| 2009/0300758 A1* | 12/2009 | Hauck | H04L 9/321 726/21 |
| 2010/0115077 A1 | 5/2010 | Tameshige et al. | |
| 2010/0180110 A1* | 7/2010 | Mittapalli | G06F 9/4411 713/100 |
| 2011/0131576 A1 | 6/2011 | Ikegaya et al. | |
| 2013/0298126 A1* | 11/2013 | Nakagawa | G06F 9/455 718/1 |
| 2014/0229944 A1* | 8/2014 | Wang | G06F 9/5088 718/1 |

FOREIGN PATENT DOCUMENTS

| | | |
|---|---|---|
| EP | 1 679 593 A2 | 7/2006 |
| JP | 2010-61391 | 3/2010 |
| JP | 2011-118557 | 6/2011 |
| WO | 2009/134219 A1 | 11/2009 |

OTHER PUBLICATIONS

Inch—PortName vs NodeName—Cisco Support Community—2009.*
Dell: Konfiguration der PXE BIOS-Funktion, 2001, URL: http://support.dell.com/support/edocs/systems/pe2500/ge/pxe/7H056a1.pdf (abgerufen am Mar. 12, 2012).
Hideaki Fujimaki, "IT Platform," Fujitsu, Fujitsu KK, Sep. 10, 2007, vol. 58, No. 5, pp. 407-412 (with English Abstract).
Japanese Examination Report dated Feb. 26, 2015 in corresponding Japanese Application No. 2014-519482 (with English translation).
German Office Action dated Mar. 27, 2017 for German Patent Application No. 10 2011 107092.7, with English translation.

* cited by examiner

COMPUTER SYSTEM, METHOD FOR STARTING A SERVER COMPUTER, SERVER COMPUTER, MANAGEMENT STATION, AND USE

TECHNICAL FIELD

This disclosure relates to a computer system having at least one server computer, a management station and at least one data network via which the at least one server computer and the management station are coupled for the purpose of data interchange. The disclosure also relates to a method of starting a server computer and a server computer having at least one processor, at least one network component and a system management chip. Finally, the disclosure relates to a management station for such a computer system and to the use of a system management chip.

BACKGROUND

Computer systems comprising at least one server computer are widely known. By way of example, what are known as blade server systems are known, in which a plurality of what are known as server blades can be plugged into a midplane of a shared chassis of the blade server system. In that case, the server blades provide computation power to execute applications. Further infrastructure components, particularly power supply units and network components, are normally inserted into the chassis from a rear end and provide operating voltage and interface functionalities for the plugged-in server blades. Furthermore, such blade server systems normally comprise what is known as a management blade, which is used inter alia to manage the server blades that have been plugged into the chassis.

To allow particularly simple and flexible association of different application programs for different server blades, it is likewise known to perform what is known as virtualization of server profiles. Virtualization of the server profiles abstracts the applications executed by the individual server blades from the actual hardware used for execution. In particular, individual server blades can be assigned virtual network identifiers used to identify the server blades instead of the physical network identifiers stored in the network components. This allows a particular application to be executed on any server blade, with the application always having the impression that it is running on the same server with the same network identifier.

In that case, the virtual network identifiers are provided by the management blade of the blade chassis when the individual server blades are actually started. By way of example, the network identifiers can be retrieved directly by the individual server blades from a nonvolatile memory of the management blade via a memory interface.

One problem of that approach is that it is unsuitable for use in heterogeneous environments. Particularly in the case of computer systems in which the server computers are not managed via a shared management blade, it is impossible to insure unique assignment of virtual addresses. Manual assignment of virtual addresses is error-prone and could therefore result in duplicate assignment of the same virtual address. The repeated use of the same virtual address can result in severe exceptional states, however, since two physical servers use the same logical address in this case and therefore disturb one another.

It could therefore be helpful to provide improved systems and apparatuses and also methods for operation thereof that allow safe and flexible association of network identifiers.

SUMMARY

We provide a computer system including at least one server computer including at least one processor, a main memory and a system management chip, a management station that manages a plurality of server profiles and selects at least one server profile from a plurality of server profiles and associates it with the at least one server computer, and at least one data network via which the at least one server computer and the management station are coupled to interchange data, wherein the system management chip of the at least one server computer is set up so that, when the system management chip is activated, it sends at least one inquiry regarding a server profile associated by the management station to the management station, so that, if at least one management connection can be set up to the management station, it configures at least one component of the server computer by using at least one network identifier transmitted by the management station, and to otherwise prevent starting of the at least one server computer with a network identifier transmitted by the management station previously.

We also provide a method of starting a server computer including activating a system management chip of the server computer, attempting to send from the system management chip an inquiry, addressed to a management station independent of the server computer, regarding a server profile associated with the management station, ascertaining whether a management connection has been set up to the management station, if the management connection has been set up successfully, configuring at least one network component of the server computer with a network identifier transmitted by the management station, and starting the server computer, and if the management connection has not been set up successfully, preventing starting of the server computer with a network identifier transmitted by the management station previously.

We further provide a server computer including at least one processor and a main memory coupled to the processor to process data, at least one network component that provides a data connection for the server computer, and a system management chip that manages the server computer via a management connection, wherein the system management chip is set up so that, when the system management chip is activated, it sends at least one inquiry regarding a server profile associated with the management station, so that, if at least one management connection can be set up to the management station, it configures the at least one network component of the server computer with a network identifier received from the management station, and to otherwise prevent starting of the server computer with a network identifier received from the management station previously.

LIST OF REFERENCE SYMBOLS

Figure 1:
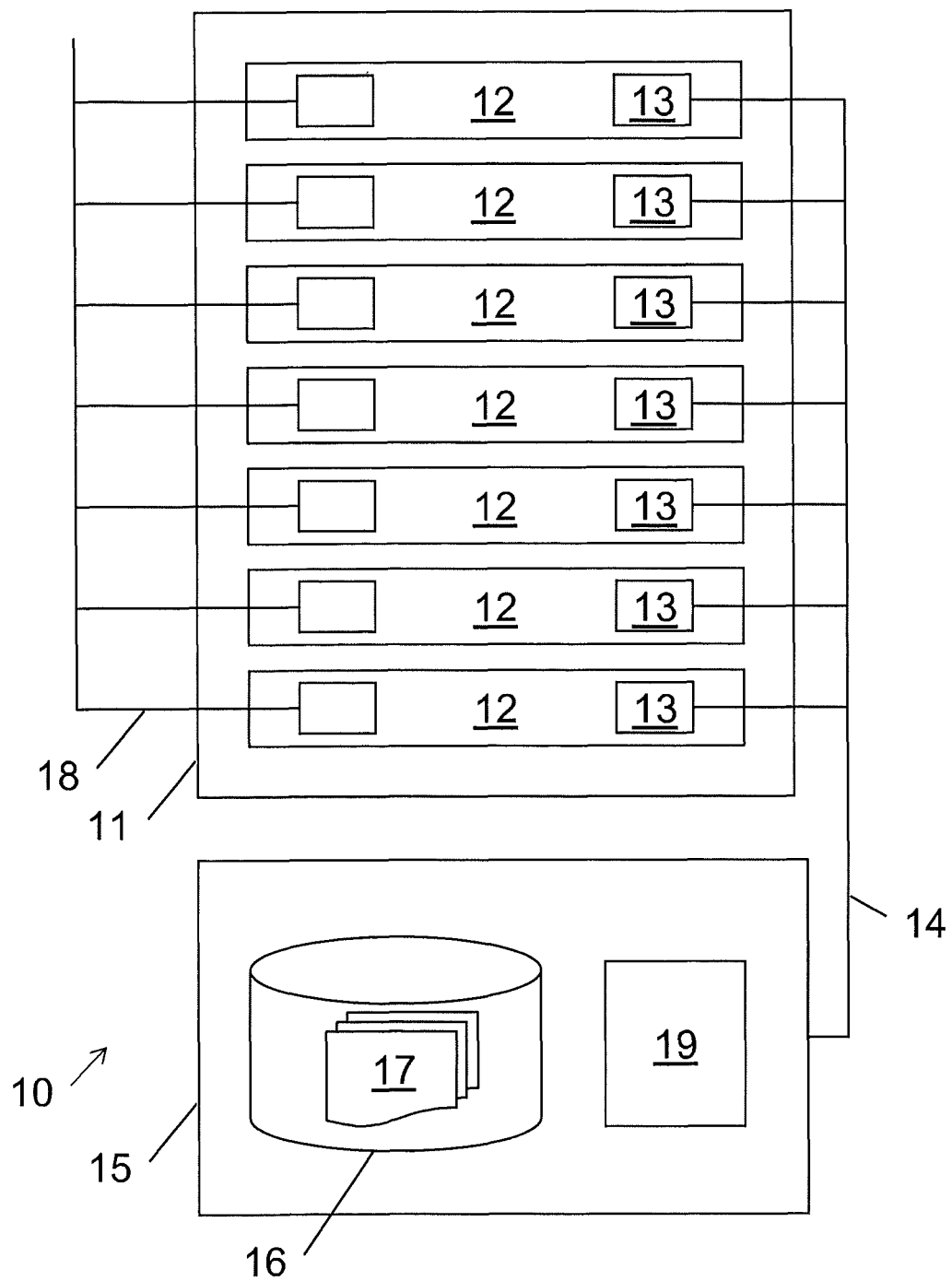
FIG. 1 shows a computer system having a plurality of rack servers and a central management station.

10 Computer system
11 Rack housing
12 Rack server
13 System management chip
14 Administration network
15 Management station
16 Database
17 Server profile
18 Further data network
19 Management software
20 Computer system
21 Address table
22 BIOS chip
23 Plug-in card
24 Server blade
25 Blade chassis
26 Management blade
27 Address table
28 BIOS chip
29 I/O adapter
30 Memory interface
S31 to S36 Method steps

DETAILED DESCRIPTION

We provide a computer system having at least one server computer, wherein the server computer has at least one processor, a main memory and a system management chip. Furthermore, the computer system has a management station, wherein the management station manages a plurality of server profiles and selects at least one server profile from the plurality of server profiles and associates it with the at least one server computer. Furthermore, the computer system may comprise at least one data network via which the at least one server computer and the management station are coupled for the purpose of data interchange. The system management chip of the at least one server computer is set up so that, when the system management chip is activated, it sends at least one inquiry regarding a server profile associated by the management station to the management station. In addition, the system management chip configures at least one component of the server computer by using at least one network identifier transmitted by the management station if at least one management connection can be set up to the management station. Otherwise, it prevents starting of the at least one server computer with a network identifier transmitted by the management station previously.

The use of a system management chip to set up a management connection allows a network identifier to be retrieved or checked. It is therefore possible for any server computer to be virtualized by configuration of a component of the server computer by the system management chip. In this case, prevention of the starting of the server computer with a network identifier retrieved from a management station previously in the event of an error on the data network or in the management station insures that a network identifier is always used by just one server computer.

We also provide methods of starting a server computer having the following steps:
  activating a system management chip of the server computer;
  attempting to send from the system management chip an inquiry, addressed to a management station independent of the server computer, regarding a server profile associated by the management station;
  ascertaining whether a management connection has been set up to the management station;
  if the management connection has been set up successfully, configuring at least one network component of the server computer by using a network identifier transmitted by the management station, and starting the server computer, and
  if the management connection has not been set up successfully, preventing starting of the server computer with a network identifier transmitted by the management station previously.

We further provide a server computer having at least one processor and a main memory, coupled to the processor, to process data. The server computer may have at least one network component providing a data connection for the server computer and a system management chip to manage the server computer via a management connection.

We still further provide a management station for such a computer system.

A system management chip is used to virtualize a server computer. In this case, the system management chip is set up so that, when the system management chip is activated, it sends at least one inquiry regarding a server profile associated by the management station via a management connection and so that, if at least one management connection can be set up to the management station, it configures at least one network component of the server computer by using a received network identifier.

Further advantages are described in the detailed description of examples. Our systems, methods, server computers and management stations are described in more detail below with reference to the figures on the basis of different examples, with the same reference symbols being used for components having the same or a similar function in different examples.

FIG. 1 shows a computer system 10. The computer system 10 comprises a rack housing 11 having a plurality of rack servers 12 held therein. By way of example, the rack servers 12 are server computers that each have two processors with an Intel architecture and main memory arranged in the server computer. Furthermore, each of the rack servers 12 comprises a system management chip (SMC) 13.

In the example, the system management chips 13 are integrated microcontrollers having dedicated main memory and nonvolatile memory and also a network interface. In the example shown in FIG. 1, a physically independent network interface is involved. Alternatively, however, (joint) use of an already existent network interface for the rack servers 12 is also possible.

The system management chips 13 are used inter alia for remote configuration and monitoring of the rack servers 12. For this purpose, the network interfaces of the system management chips 12 connect to a management station 15 via an administration network 14, for example, a local area Ethernet network. Preferably, the system management chips 13 are also supplied with an operating voltage in a standby state for the rack servers 12.

By way of example, the management station 15 is a server computer arranged independently of the rack housing 11 and functionally independent of the rack servers 12. By way of example, it is a separate server computer used for administration of the rack servers 12 and is of particularly failsafe design. The management station 15 comprises a database 16 that stores different server profiles 17. Each of the server profiles is associated with a separate application or a server service. By way of example, a first server profile is associated with an Apache web server, a second server profile is associated with a Microsoft Exchange Server and a third server profile is associated with an Oracle database server.

The server profiles 17 can either be created manually by an administrator or produced automatically by analyzing existing, physical server computers. Each of the server profiles 17 comprises various configuration parameters. By way of example, the first server profile comprises configuration parameters for channel activation and deactivation of different input/output channels, a virtual MAC address for identification in a local area network and/or virtual WWPN or WWNN identifiers for a memory network and also parameters for a boot configuration for the associated, virtualized server service. By way of example, the information regarding the boot configurations may contain a boot mode such as PXE, SAN or iSCSI, and a boot device such as a fiber channel storage appliance or an iSCSI target and also a priority. At least some of the stored parameters are used to uniquely identify the server service associated with the server profile 17.

The rack servers 12 connect to a further data network 18 via additional network components, for example, incorporated network components of the respective motherboards or plug-in cards arranged in expansion slots. The further data network 18 is used, inter alia, for data interchange between the individual rack servers 12 and various client computers which are not shown in FIG. 1. Alternatively, the administration network 14 and the further data network 18 may also be the same physical data network which merely has a logical split, for example, by using different virtual private networks.

A first step may involve all of the rack servers 12 existing in the administration network 14 being detected by the management station 15. By way of example, the management station 15 recognizes an inquiry from the system management chips 13 on the basis of what is known as the dynamic host configuration protocol (DHCP) and then enters the physical network identifiers of the system management chips 13 into a table or database on the available server computers. The rack servers 12 that have been recognized are then transferred to management software 19 that runs on the management station 15 and are available for the association of server profiles 17. Alternatively, there may naturally also be another, for example, manual, configuration interface provided. By way of example, a system administrator can select single or groups of rack servers 12 through the management station 15 for virtualization.

The server profiles 17 of the database 16 can then be associated with one of the plurality of the rack servers 12 by the management software 19. If a particular server profile 17 needs to be activated, it is associated with one of the available rack servers 12, and the associated configuration parameters are transferred to the associated system management chip 13 via the administration network 14. The system management chip then configures, inter alia, the network components of the rack server 12 used to access the external data network 18 by using the transferred configuration parameters in what is known as a preboot phase. Next, the power supply for a motherboard and a processor arranged thereon for the rack server 12 is activated and the processor starts up by using the set configuration parameters and executes the server software according to the associated server profile 17.

Figure 2:
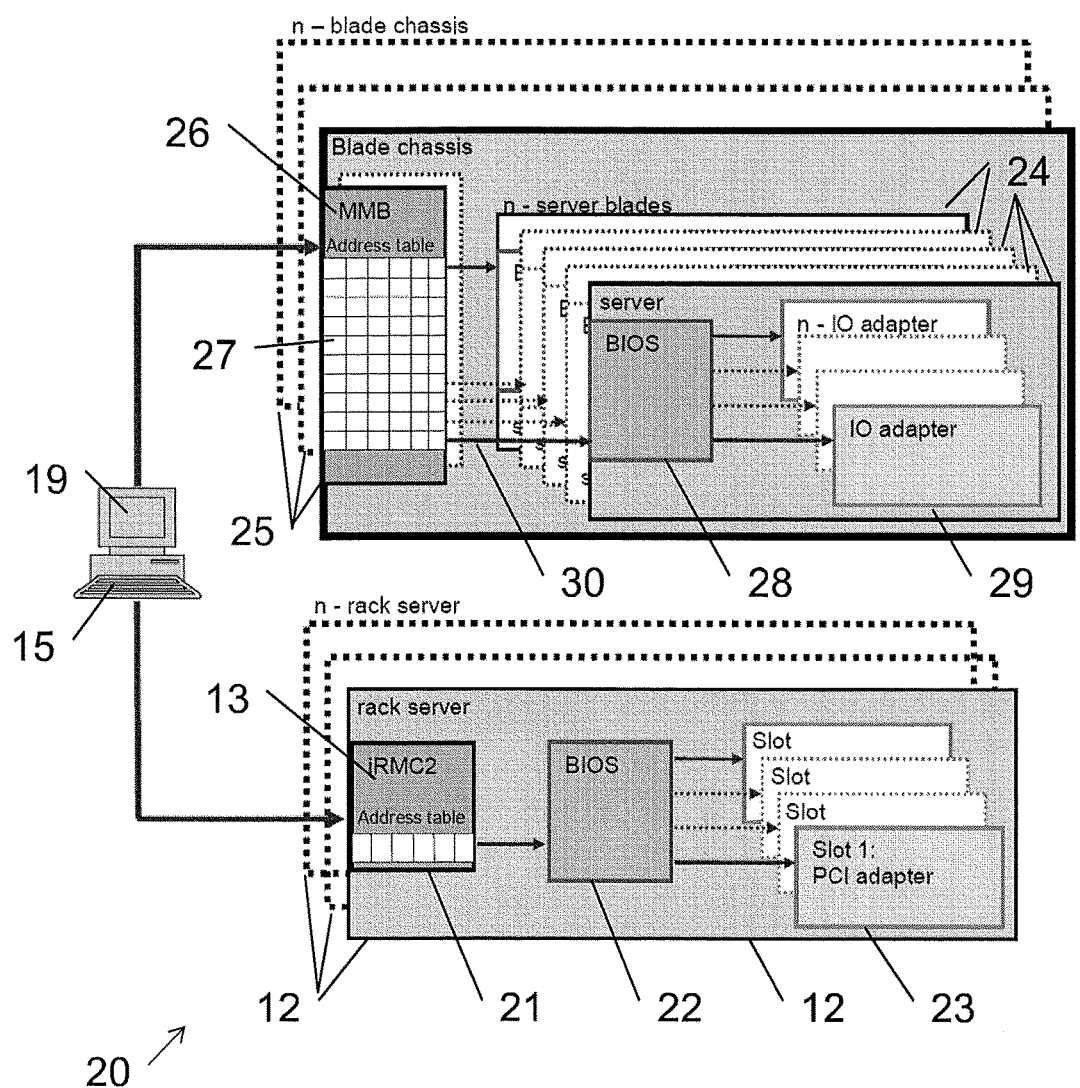
FIG. 2 shows an arrangement including a management station, a plurality of server blades and a plurality of rack servers.

FIG. 2 shows another computer system 20 according to a second example. The computer system 20 is a heterogeneous computer system in which a plurality of server computers in the form of rack servers 12 and server blades 24 are managed jointly by a central management station 15 with management software 19 running thereon.

Each of the rack servers 12 has a system management chip 13 with address data contained therein for one or more I/O components. In the example, the address data are stored in the form of an address table 21 in a main memory of the system management chip 13. This is advantageous particularly when a rack server 12 has a plurality of I/O components. It goes without saying that it is also possible for single address entries to be stored in a memory of the system management chip 13, particularly when each rack server 12 requires only a single network identifier during operation.

The system management chip 13 is coupled to a plurality of plug-in cards 23 via a BIOS chip 22. By way of example, the plug-in cards 23 are PCI network cards, fiber channel adapters or other I/O components of the rack server 12. The plug-in cards 23 are configured by using the address table 21 of the system management chip 13. By way of example, the system management chip 13 can write appropriate configuration data directly into suitable, volatile or nonvolatile configuration registers via a system management bus. Alternatively, the BIOS chip 22 or the plug-in cards 23 can retrieve appropriate values from the system management chip 13.

The address data required for configuration are retrieved from or confirmed by the management station 15 whenever a rack server 12 is started by the system management chip 13. If there is no response from the management station 15 to an inquiry from the system management chip 13, the rack server 12 is not started. Instead, the rack server 12 remains in what is known as a preboot phase until the requested address data are provided or confirmed by the management station 15. Alternatively, it is also possible for the rack server 12 to be started by using physical addresses stored in the respective plug-in cards 23. In this case, virtualization is not available for the respective rack server 12.

In the example shown, a plurality of server blades 24 are arranged in a shared blade chassis 25. Furthermore, the blade chassis 25 comprises a management blade 26 with an address table 27 stored therein. The management blade 26 and the address table 27 stored therein can also be designed to be redundant. Similarly, further blade chassis having further server blades can be managed by the management station 15. This is indicated by dashes in FIG. 2.

Each of the server blades 24 comprises a BIOS chip 28 and one or more I/O adapters 29. By way of example, the I/O adapters are network components, SAN adapters or fiber channel adapters. When a server blade 24 is started, the BIOS chip 28 retrieves associated address information for the I/O adapters 29 from the address table 27 of the management blade 26. This is done via a memory interface 30 between the BIOS chip 28 and the management blade 26, for example. In the example, the data entered in the address table 27 are managed and possibly updated by the management software 19 of the management station 15. Hence, a server profile 17 can be associated both with a rack server 12 and with a server blade 24.

Figure 3:
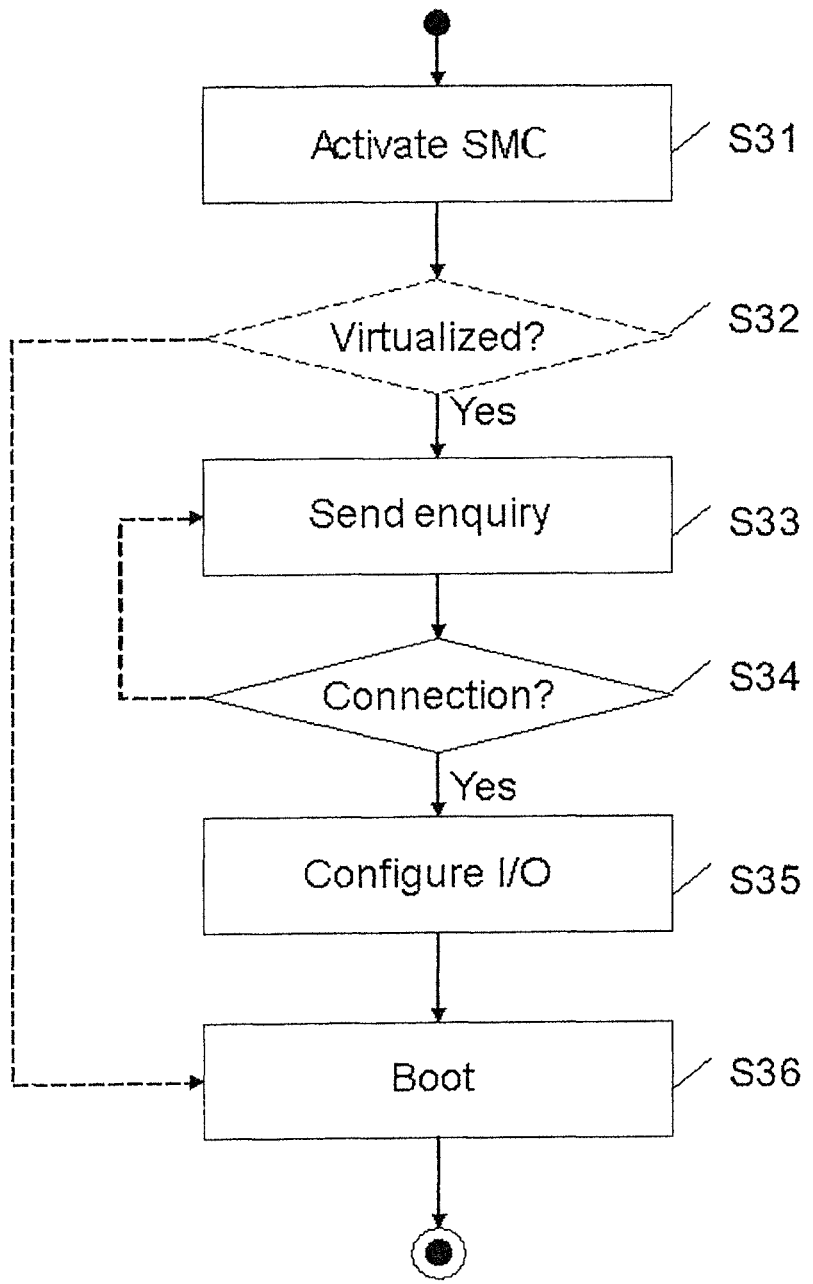
FIG. 3 shows a flowchart for a method for starting a server computer.

FIG. 3 describes a method of starting a server computer such as a rack server 12, a server blade 24 or a single server computer.

A first step S31 involves a system management chip 13 of the server computer being activated. By way of example, the system management chip 13 can be activated by applying a power supply when first switching on or after a power failure or by waking the system management chip 13 via an administration network 14. In the latter case, the management station 14 sends what is known as a magic packet according to the wake-on-LAN (WoL) protocol to the system management chip 13 of a server computer via the administration network 14.

In an optional step S32, the system management chip 13 first of all checks whether virtualization of the rack server 12 is desired. For this purpose, a nonvolatile memory of the system management chip 13 or of another component of the server computer stores an identification that indicates whether virtualization needs to be used. Alternatively, such a check can also be sent to the management station 15 via the administration network 14. If the relevant identification indicates that the server computer does not need to be virtualized, the method immediately skips to step S36, in which the server computer is booted conventionally.

If, on the other hand, step S32 recognizes that virtualization needs to be used, the method is continued in step S33 by ascertaining at least one network identifier or another configuration parameter for virtualization. In the example, the system management chip 13 requests a virtual MAC address from the management station 15, for example. For this purpose, it transmits a configuration inquiry according to a remote configuration protocol to the management station 15 via an administration network 14. The configuration inquiry is evaluated by the management software 19 of the management station 15.

Alternatively, an identifier can also be ascertained from a local memory of the computer system. In this case, however, use thereof must likewise be preceded by the setup of a management connection to the management station 15 to verify validity of the stored identifier.

In a step S34, the system management chip 13 therefore checks whether it has been possible to successfully set up a management connection to the management station 15. By way of example, the system management chip 13 checks whether a virtual MAC address or another identifier for configuring at least one I/O component of the server computer has been received from the management station 15 or a locally stored address has been confirmed by the latter. If this is not the case, the system management chip 13 continues to await a response. After a predetermined period has elapsed, an inquiry is optionally sent to the management station 15 again in step S33.

Alternatively, it is also possible for the method, which is not shown, to continue after a predetermined time has elapsed in step S36 by booting the server computer by using physical identifiers for the incorporated I/O components.

If the requested identifier and possibly further requisite configuration parameters have been obtained for I/O components of the server computer, the I/O components of the server computer are configured in step S35. In particular, this involves configuration of network components for access in a further data network 18. By way of example, a virtual MAC address for a network card can be set and also a worldwide name for a fiber channel component.

The provision or confirmation of a previously provided virtualized address allows the server profile 17 with which the virtual address is associated to be executed on the server computer previously determined by the management station 15. This is done in step S36 by booting the server computer, for example, a first rack server 12, by using the configuration data obtained from or confirmed by the management station 15.

If a server profile 17 later needs to be associated with another server computer such as a second rack server 12, the first rack server 12 is first shut down. To this end, appropriate control commands are transferred from the management software 19 via the administration network 14 to the system management chip 13, which then initiates shutdown of the first rack server 12. Following acknowledgement, a link to the server profile 17 from the first rack server 12 is erased in the management station 15. Optionally, it is also possible for configuration data, particularly a virtual address, stored locally in the first rack server to be erased or declared invalid. Subsequently, the same profile 17 can then be associated with the second rack server 12, which in turn can be activated at the request of the management software 19 and booted by using the same configuration parameters as the first rack server 12 previously. The second rack server 12 can then perform the function that was executed by the first rack server 12 previously, without the software running thereon or external client computers being able to recognize any change in the network environment.

A similar transfer is also possible in the event of failure of a single rack server. If the first rack server 12 fails permanently, for example, because components arranged therein have been damaged, a server profile running thereon is first released after the first rack server 12 has been shut down or logged off as defective. The defective rack server 12 can then be removed and replaced with a rack server 12 of the same or similar design. In this case, the management station 15 first needs to recognize the freshly installed rack server 12. To this end, as described above, it is possible to use the DHCP protocol, for example, to detect a physical address for a system management chip of the new rack server 12. Subsequently, it is then possible for, by way of example, manual IP rerouting from the IP address of the system management chip 13 of the defective rack server 12 to the IP address of a system management chip 13 of the new rack server 12 to be set up so that the management software 19 is able to address the new rack server 12 at the same address as the first rack server 12c. Subsequently, the server profile 17 can be associated with the new rack server as described above.

The arrangements and methods described above insure that server profiles 17 can easily be associated with different server computers in a computer system 10 or 20. In this case, it is irrelevant whether the association is made directly, as described in the case of the rack servers 12 or indirectly, for example, through the mediation of a management blade 26 as described with reference to the server blades 24. In any case, it is insured that two server computers having the same virtual address or the same virtualization parameter are never booted and, hence, come into conflict with one another.

The features described above for the computer systems 10 and 20 and the method steps described for the method can be combined with one another in almost arbitrary fashion to obtain further advantages of the systems and methods described here.

The invention claimed is:

1. A method of starting a server computer comprising:
    activating a system management chip of the server computer, the server computer being a rack server;
    checking, by the system management chip, whether virtualization of the rack server is desired;
    if no virtualization is desired, booting the rack server using physical addresses stored in respective plug-in cards of the rack server; and
    if virtualization is desired, attempting to send, in a preboot phase, from the system management chip an inquiry over a data network, addressed to a management station independent of the rack server, regarding a server profile associated with the management station in order to request a virtual network identifier from the management station or to validate a virtual network identifier previously stored in a local memory of the rack server;

ascertaining, in the preboot phase, whether a management connection has been set up to the management station;

if the management connection has been set up successfully between the system management chip and the management station within a predetermined time period, configuring, in the preboot phase and before a power supply for at least one processor is activated, at least one network component of the rack server with a virtual network identifier transmitted by the management station, and starting the rack server; and if the management connection has not been set up successfully between the system management chip and the management station within the predetermined time period, preventing starting of the rack server with a virtual network identifier transmitted by the management station previously by remaining in the preboot phase or starting at least one server computer using the physical addresses stored in respective plug-in cards of the at least one server computer.

2. The method according to claim 1, wherein the attempted sending and ascertainment are performed repeatedly in the preboot phase of the rack server until the management connection has been set up successfully.

3. The method according to claim 1, further comprising:
marking a virtual network identifier received from the management station previously as invalid if it is not possible for a management connection to be set up between the system management chip and the management station within the predetermined period.

4. The method according to claim 1, wherein
the system management chip configures at least one plugin card of the rack server by writing appropriate configuration data directly into suitable configuration registers of the at least one plug-in card via a system management bus of the rack server.

5. The method according to claim 1, further comprising:
storing a first address table for a plurality of server blades in a management blade, the plurality of server blades and management blade arranged in a shared blade chassis, each server blade comprising a first BIOS chip and at least one I/O adapter, and the first BIOS chip of each server blade is configured to retrieve associated address information for the at least one I/O adapter of the respective server blade from the first address table of the management blade; and
storing in the system management chip a second address table, the at least one rack server comprises a second BIOS chip; and the second BIOS chip retrieves configuration data for the at least one plug-in card from the second address table.

6. The method according to claim 1, wherein each one of the plurality of server profiles is associated with a separate application or a server service, comprising at least one of the following: a web server profile, a Microsoft Exchange Server profile and a database server profile.

7. A rack server comprising:
at least one processor and a main memory coupled to the processor to process data;
at least one network component that provides a data connection for the rack server; and
a system management chip that manages the rack server via a management connection;
wherein the system management chip is set up so that, when the system management chip is activated, the system management chip checks whether virtualization of the rack server is desired;

if no virtualization is desired, the rack server is booted using physical addresses stored in respective plug-in cards of the rack server; and if virtualization is desired, the system management chip sends, in a preboot phase, at least one inquiry over a data network regarding a server profile associated with a management station in order to request a virtual network identifier from the management station or to validate a virtual network identifier previously stored in a local memory of the rack server;

so that, if at least one management connection can be set up between the system management chip and the management station within a predetermined time period, the system management chip configures, in the preboot phase and before a power supply for the processor is activated, the at least one network component of the rack server with a virtual network identifier received from the management station; and to otherwise prevent starting of the rack server with a virtual network identifier received from the management station previously by remaining in the preboot phase or starting at least one server computer using physical addresses stored in respective plug-in cards of the at least one server computer.

8. The rack server according to claim 7, wherein the rack server comprises at least one power supply unit to operate the rack server independently of the power supply of the management station.

9. The rack server according to claim 7, further comprising at least one second network component to set up the management connection, wherein the first and second network components are independent of one another and the second network component has a second, physical network identifier.

10. The rack server according to claim 7, wherein
the system management chip configures at least one plugin card of the rack server by writing appropriate configuration data directly into suitable configuration registers of the at least one plug-in card via a system management bus of the rack server.

11. The rack server according to claim 7, wherein each one of the plurality of server profiles is associated with a separate application or a server service, comprising at least one of the following: a web server profile, a Microsoft Exchange Server profile and a database server profile.

12. A computer system comprising:
at least one blade chassis comprising a management blade and at least one server blade;
at least one rack server arranged outside the at least one blade chassis and comprising at least one processor, a main memory, at least one plugin-card and a system management chip;
a management station that manages a plurality of server profiles and selects at least one server profile from the plurality of server profiles and associates it selectively with the at least one server blade or the at least one rack server; and
a data network via which the management blade of the at least one blade chassis, the at least one rack server and the management station are coupled to interchange data;
wherein the system management chip of the at least one rack server is set up to perform the following steps:

on activation, to send, in a preboot phase of the respective rack server, an inquiry over the data network requesting a server profile from the management station and to await a response from the management station;

if a management connection can be set up between the system management chip and the management station within a predetermined time period, the system management chip configures, in the preboot phase and before a power supply for the at least one processor of the respective rack server is activated, the at least one plugin card of the respective rack server by using at least one virtual network identifier transmitted by the management station; and if the management connection has not been set up successfully within the predetermined time period, the system management chip prevents starting of the respective rack server with a virtual network identifier transmitted by the management station previously by remaining in the preboot phase or starting the respective rack computer using at least one physical network identifier stored in respective plug-in cards of the respective rack server, wherein the system management chip of the at least one rack server is further set up to perform the following steps:

before sending the inquiry, the system management chip checks whether virtualization of the respective rack server is desired;

if no virtualization is desired, the rack server is booted using physical addresses stored in respective plug-in cards of the respective rack server; and if virtualization is desired, the system management chip sends an inquiry over the data network in order to request a virtual network identifier from the management station or to validate a virtual network identifier previously stored in a local memory of the respective rack server.

13. A management station for a computer system according to claim 12, comprising:

at least one network interface that couples the management station to a data network;

a first database that stores a plurality of server profiles;

a second database that stores a plurality of physical network identifiers from a plurality of rack servers, at least one association controller that selects at least one server profile from the plurality of server profiles, associates the selected server profile with at least one rack server from the plurality of rack servers, activates the associated rack server by transmitting a first control packet via the data network to a management chip of the associated rack server, and transmits a second data packet with at least one virtual network identifier associated with the selected server profile via the data network to the management chip of the associated rack server.

14. The computer system of claim 12, wherein the system management chip configures the at least one plugin card of the respective rack server by writing appropriate configuration data directly into suitable configuration registers of the at least one plug-in cards via a system management bus of the respective rack server.

15. The computer system of claim 12, wherein the management blade of the at least one blade chassis stores a first address table, each server blade comprising a first BIOS chip and at least one I/O adapter, and the first BIOS chip of each server blade is configured to retrieve associated address information for the at least one I/O adapter of the respective server blade from the first address table of the respective management blade; and the system management chip of the at least one rack server stores a second address table, the at least one rack server comprises a second BIOS chip; and the second BIOS chip retrieves configuration data for the at least one plug-in card from the second address table.

16. The computer system of claim 12, wherein each one of the plurality of server profiles is associated with a separate application or a server service, comprising at least one of the following: a web server profile, a Microsoft Exchange Server profile and a database server profile.

17. The computer system according to claim 16, wherein the at least one server profile stores at least one detail selected from the group consisting of an MAC address, a fiber channel port name, a fiber channel node name, a boot mode, an address for a boot medium, a virtual LAN identifier, a LAN configuration, a fiber channel over Ethernet (FCoE) configuration and an iSCSI identifier.

* * * * *